(12) United States Patent
Werner et al.

(10) Patent No.: US 6,595,732 B2
(45) Date of Patent: Jul. 22, 2003

(54) RETAINER CAGE FOR FASTENER

(75) Inventors: Ronald H. Werner, Burlington, IA (US); Ramakrishna R. Nandyala, Monmouth, IL (US); Robert Eric Dotseth, Burlington, IA (US); David J. Sanning, Gladsone, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/016,287

(22) Filed: Nov. 3, 2001

(65) Prior Publication Data

US 2002/0085896 A1 Jul. 4, 2002

Related U.S. Application Data

(60) Provisional application No. 60/245,806, filed on Nov. 30, 2000.

(51) Int. Cl.$^7$ .............................. F16B 37/00; F16B 37/08
(52) U.S. Cl. ..................... 411/104; 411/112; 411/432; 411/999
(58) Field of Search ................. 411/104, 111, 411/112, 113, 432, 999

(56) References Cited

U.S. PATENT DOCUMENTS

| | | | | |
|---|---|---|---|---|
| 2,495,037 A | * | 1/1950 | Tinnerman | 411/112 |
| 2,649,126 A | * | 8/1953 | Tinnerman | 411/113 |
| 3,035,624 A | * | 5/1962 | Jaworski | 411/112 |
| 5,022,804 A | * | 6/1991 | Peterson | 411/104 |
| 5,795,117 A | * | 8/1998 | Onoda | 411/104 X |
| 6,146,071 A | * | 11/2000 | Norkus et al. | 411/104 |

* cited by examiner

*Primary Examiner*—Neill Wilson
(74) *Attorney, Agent, or Firm*—John William Stader; Rebecca L. Henkel

(57) ABSTRACT

An open retainer cage provides for retaining a threaded female fastener having a non-circular cross section such as a nut adjacent to a surface of a component part for blind-hole fastening. The retainer cage includes a web portion and a plurality of legs extending from the web portion toward the surface of the component part. The plurality of legs are configured to position the web portion parallel to the surface of the component part. At least one of the plurality of legs is affixed to the surface of the component part. An opening is provided between the plurality of legs for receiving the nut within the plurality of legs, the web portion and the surface of the component part. At least one leg is configured to abut the non-circular cross section of the nut for resisting rotation of the nut. The web can also be provided with a tongue extending from the web over an area not occupied by one of the legs. The web and the legs can be integrally formed from a single piece of material and the tongue can be integrally formed with the web. The tongue can be deformed to block the opening or can be provided with a hole configured to receive a blocking device, such as a removable pin or a threaded screw which is used to confine a nut within the retainer cage.

15 Claims, 5 Drawing Sheets

RETAINER CAGE FOR FASTENER

This application claims the benefit of provisional application No. 60/245,806 filed Nov. 30, 2000.

FIELD OF THE INVENTION

The present invention relates to mechanical fastening of components, and more particularly to a retainer cage for blind-hole fastening of surface mounted components on a work vehicle.

BACKGROUND OF THE INVENTION

Work vehicles used in the agricultural and construction industries typically have many surface mounted components attached at various locations on the work vehicle. Surface mounted components can include, for instance, structural parts such as frame components, operational parts such as a motor or hydraulic actuators, as well as vehicle body parts such as fenders and guards.

A surface mount typically involves one surface of a first component abutted against another surface of a second component. The components are then secured together, such as by fasteners. Often at least one fastener extends through aligned holes in both components. The surface mounted component to be added is referred to as the mounted component and the other component part is referred to as the supporting component or the support structure.

Surface mounted components are often assembled using a threaded male fastener such as a bolt that is configured to threadingly mate through the aligned holes with a threaded female fastener such as a nut. An assembler will usually hold either the bolt or the nut against rotation and torque the other of either the bolt or the nut to tighten the threaded fastener. The surface at which the assembler applies torque to the fastener will be referred to as the proximal surface and the surface at which the fastener is held against rotation will be referred to as the distal surface.

In some surface mounting situations, the female fastener must be aligned with the male fastener at a blind-hole. A blind-hole is the exit hole on a distal surface that is not readily seen or accessible by the assembler and through which the threaded end of the bolt protrudes. A blind hole can be on either the mounted component or on the supporting structure. In either situation, it may be difficult or impossible for an assembler to apply a tool to the nut for tightening or loosening the threaded fastener used to secure the surface mounted components.

Various assembly solutions have been used by assemblers to overcome the problem of restricted sight or access to the fastening nut on the distal surface. For example, a nut can be welded to the distal or blind side of the surface mounted component so that the assembler does not have to engage the nut with a tool during assembly. However, a nut that is permanently welded in place may not be suitable for some assembly situations since the fixed position of the nut does not allow for adjustments that may be needed due to the manufacturing tolerances of the components. For example, most fastener holes in both component parts are often separately pre-drilled prior to assembly.

Another technique for blind-hole fastening is to permanently attach a four-sided retainer cage containing a nut to the distal surface. The retainer cage with the pre-installed nut is often welded to the blind side of the appropriate surface mount component. The retainer cage allows some freedom of movement by the retained nut to compensate for adjustments needed due to the tolerances variations of the components.

However, because the retained nut is permanently installed in the fixed retainer cage, any concurrent or subsequent manufacturing or assembly procedures can damage the exposed female threads on the retained nut before mating with the male fastener. For example, if the component part with the retainer cage on the distal surface is painted, welded or sanded, the retained nut is subjected to weld spattering, paint or blasting media. These subsequent procedures require additional non-value added work to the exposed retained nut either before the subsequent procedures (such as masking the female threads on the nut) or after the subsequent procedures (such as re-tapping the threads). If there is substantial damage to the nut, either the retained nut or both the nut and the permanently affixed retainer cage may have to be removed and replaced.

Thus, there is a need for an open retainer cage that provides for the initial installation of a nut in the retainer cage after the retainer cage has been attached to the component part and only after any subsequent processes have been performed on the component part. There is a need for a retainer cage that can be utilized with currently existing assembly and manufacturing tooling. There is also a need for a retainer cage that allows for replacement of a damaged nut during the manufacturing process or during subsequent procedures such as maintenance.

SUMMARY OF THE INVENTION

According to the present invention, an open retainer cage for a nut type fastener includes a web with a first leg, a second leg and a third leg. All three legs are attached to the web and are configured to form a retainer cage with at least two of the legs in facing opposition to each other. The web can be provided with a tongue extending from the web over an area not occupied by one of the legs. The web and the three legs can be integrally formed from a single piece of material and the tongue can be integrally formed with the web. The tongue can bent or can be provided with a hole configured to receive a removable blocking member, which is used to confine a nut within the retainer cage.

There is also provided, in accord with the present invention, a retainer cage assembly for blind-hole mounting a component secured by threaded fasteners including a nut retained in an open retainer cage. The retainer cage includes a web with a first leg, a second leg and a third leg. All three legs are attached to the web and are configured to form a retainer cage with at least two of the legs in facing opposition to each other. The web can be provided with a tongue extending from the web over an area not occupied by one of the legs. The web and the three legs can be integrally formed from a single piece of material and the tongue can be integrally formed with the web. The tongue can be deformed or can be provided with a hole configured to receive a selectively insertable blocking member, which is used to confine a nut within the retainer cage.

There is also provided a method for retaining a nut type fastener including the steps of affixing an open retainer cage having a tongue portion to a surface. The nut is then inserted in the retainer cage. The nut can be confined in the retainer cage by installing a blocking member in a hole defined in a tongue portion of the retainer cage or by bending the tongue portion towards the surface thereby restricting the nut from movement out of the retainer cage.

DETAILED DESCRIPTION OF EXAMPLARY EMBODIMENTS

Figure 1:
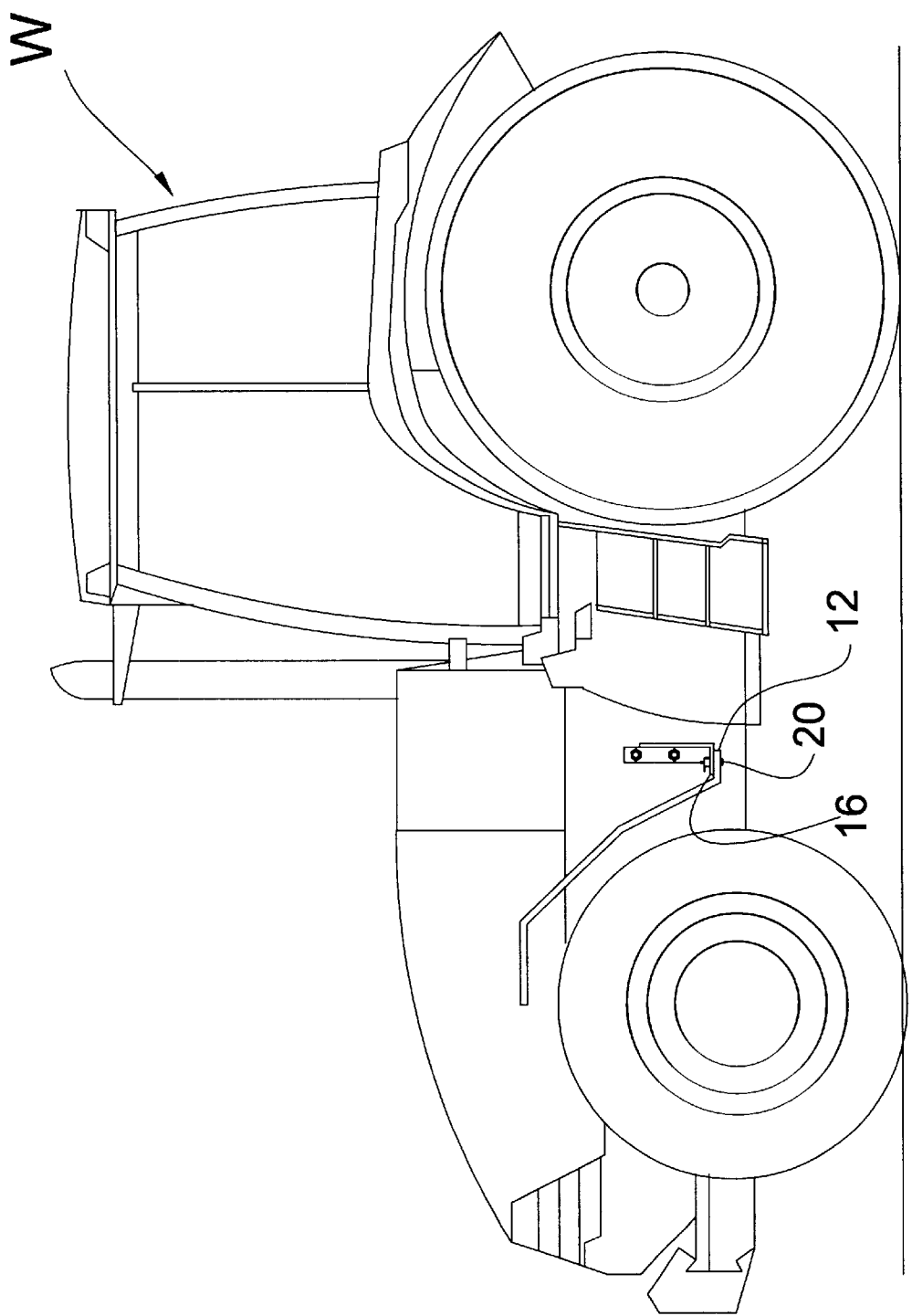
FIG. 1 is a side view of a tractor type work vehicle showing an exemplary embodiment of the retainer cage according to the present invention for use in surface mounting one component part to another component part on the work vehicle.
Figure 2:
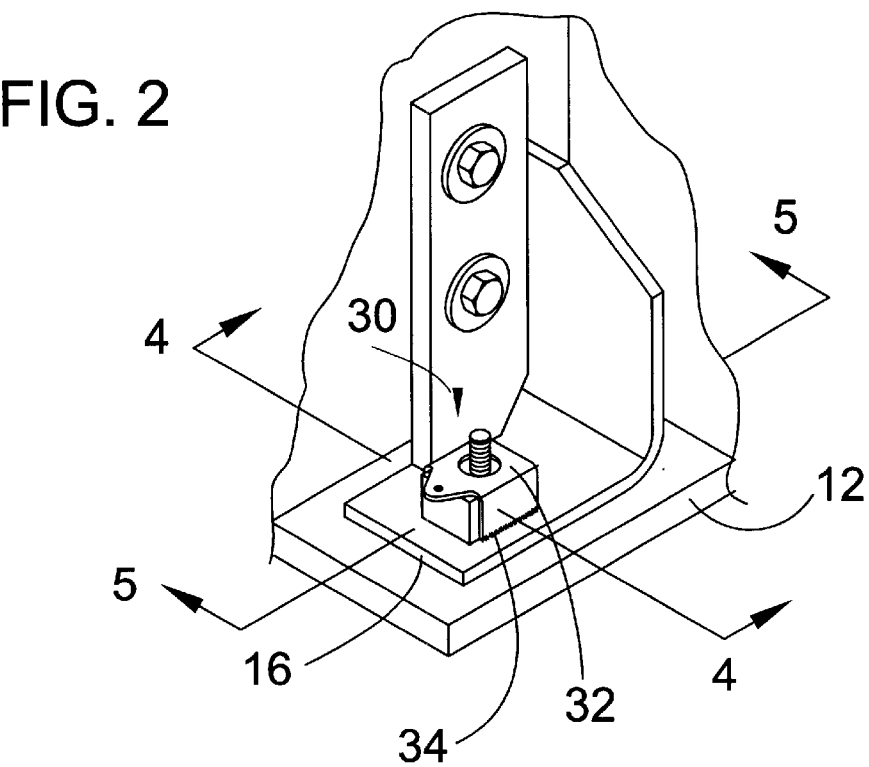
FIG. 2 is a perspective view of the retainer cage according to the present invention for attaching a component part using a nut-type female fastener.

Referring now to the drawings, FIG. 1 illustrates a work vehicle W such as an agricultural tractor. The work vehicle includes a vehicle frame and other attached components, which can be generally referred to as the support structure. As previously described, additional surface mounted components can be attached to the work vehicle by using a threaded fastener secured through aligned holes in two abutting component parts. A threaded fastener refers to a threaded male fastener such as a bolt, which is inserted from one surface, and a threaded female fastener such as a nut, which engages the threaded portion of the bolt at an opposite surface of the two abutting component parts.

Figure 4:
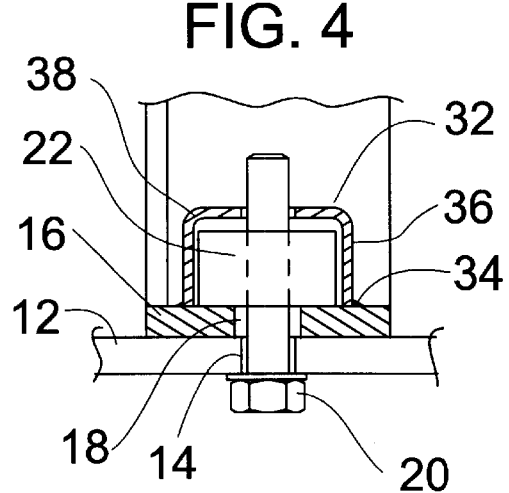
FIG. 4 is a sectional view of the retainer cage illustrated in FIG. 2, along the line 4—4.

As shown in FIG. 1 and as better seen in the enlarged sectional view of FIG. 4, a first component part 12 is shown having a first fastener hole 14. A second component part 16 having a second fastener hole 18 is shown abutting the first component part 12 along mutually compatible and abutting surfaces. The fastener holes are generally aligned and a threaded bolt 20 is shown extending from one exterior surface though both holes to the other exterior surface. The two outside surfaces that do not abut are referred to as the exterior surfaces. A threaded female fastener such as nut 22 is shown threaded on the threaded portion of the bolt 20 at the other exterior surface. The female fastener 22 is illustrated as a square nut-type fastener. However, the female fastener 22 could also be any type of non-circular female fastening device having an inside thread, such as a castle nut or a hex nut.

Both component parts 12 and 16 are illustrated in FIG. 1 as having exterior surfaces (i.e. the non-abutting surfaces) that are readily accessible by an assembler. The illustration is only for purposes of clarity and understanding. In many surface mounting situations, one exterior surface will be orientated so that a portion of the surface is not readily visible or accessible to the assembler. A hole in such a surface that is not accessible or visible is referred to as a blind-hole. Usually the blind-hole is on the distal surface since the assembler can not apply torque from a surface he can not access or see.

As previously discussed, in some of these blind-hole situations, a nut 22 needs to be positioned adjacent the inaccessible surface at the blind-hole, which is not readily visible or accessible to the assembler. Thus it is desirable to use a retainer cage to hold the nut adjacent the distal surface of the component. The retainer cage can be pre-mounted over the exit hole before the component part is assembled in an inaccessible position.

The retainer cage 30 of the present invention is best seen with reference to FIGS. 2–5. The retainer cage 30 includes a web portion 32, which is preferably square in shape. A plurality of legs extend downward from the web portion and have an appropriate length so the web portion 32 is positioned generally parallel and at a predetermined distance offset from the distal surface of the component part 16. The offset distance accommodates the thickness of the nut 22 that is to be retained in the cage 30. At least one of the plurality of legs is affixed to the surface of the component part 16 as indicated by the affixing material 34.

Figure 5:
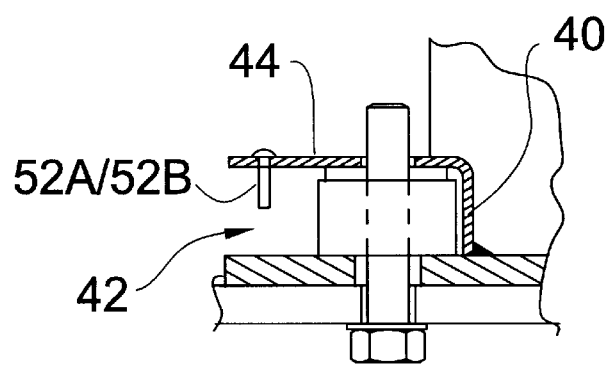
FIG. 5 is a sectional view of the retainer cage illustrated in FIG. 2, along the line 5—5.
Figures 7, 8A, 8B:
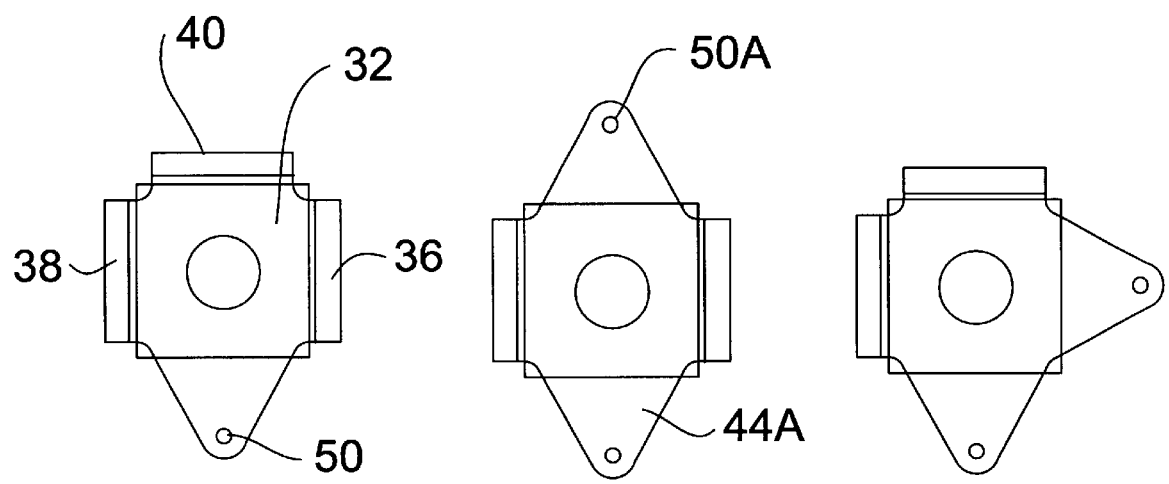
FIG. 7 is a top schematic view of FIG. 2 showing the leg position of the three-leg embodiment of the retainer cage.
FIG. 8A is a top schematic view of an alternative embodiment showing the leg position of a two-leg embodiment of the retainer cage.
FIG. 8B is a top schematic view of another alternative embodiment showing the leg position of another two-leg embodiment of the retainer cage.

Preferably the plurality of legs includes a first leg 36, a second leg 38 and a third leg 40. Preferably the legs extend perpendicularly from the web portion 32 and are configured to form an open cage for the nut 22. As best seen in FIG. 7, the first 36 and second 38 legs are configured to be parallel and in facing opposition to each other. The third leg 40 is offset from a position between the first and second legs and is perpendicular to both of the other two legs. An opening 42, as seen in FIG. 5, is provided opposite the third leg 40 and between the two parallel legs. The opening 42 is sized so that nut 22 can be inserted into the retainer cage 30.

The parallel legs 36 and 38 are configured and positioned a predetermined distance apart so that a nut 22 having a pre-selected cross-sectional dimension will fit into the retaining cage. At least one side face of the non-circular nut 22 will abut and bind on one leg of the retaining cage so as to resist rotation by the nut. The legs are positioned so that there is not be enough clearance between the legs and the nut 22 to allow the nut to rotate with the bolt 20 when the assembler torques the bolt. Thus the bolt 20 will rotate and threadingly tighten onto the non-rotating nut 22 to secure the component parts 12 and 16 together. A center orifice 48 in the web portion 32 accommodates the length of the bolt 20 when the bolt threads into the retained nut 20 as shown in FIGS. 2–5.

The retainer cage 30 is preferably formed from metal such as weldable iron. In a preferred embodiment, the web portion 32 and the three legs 36, 38 and 40 are integrally formed from a single piece of flat metal. The web and legs may be initially stamped or cut from a flat sheet of metal and may then be further formed into the final cage shape. For a retainer cage 30 constructed from a weldable metal, the affixing structure 34 is a metal weld or weldment that joins the legs to the surface of the component part 16.

The retainer cage 30 can also be formed from other suitable materials such as aluminum, plastic or a composite material if the component part 16 is made of a similar material. For example, the web and legs could be integrally molded from a plastic or composite material directly formed into a final shape or could initially be formed into a plastic or composite sheet material and then molded into the final cage shape. Suitable affixing processes are known for attaching these alternate material retainer cages. For example, an epoxy or an adhesive or a heat bonding process can be used that is compatible with both the material of the retainer cage and the surface to which the legs are attached.

As an alternative to the integral web and leg construction described above, the web portion 32 can be formed as one piece and the legs 36, 38 and 40 can be formed separately and attached to the web portion by the affixing processes previously described, such as by metal welding or by heat bonding.

Figure 3:
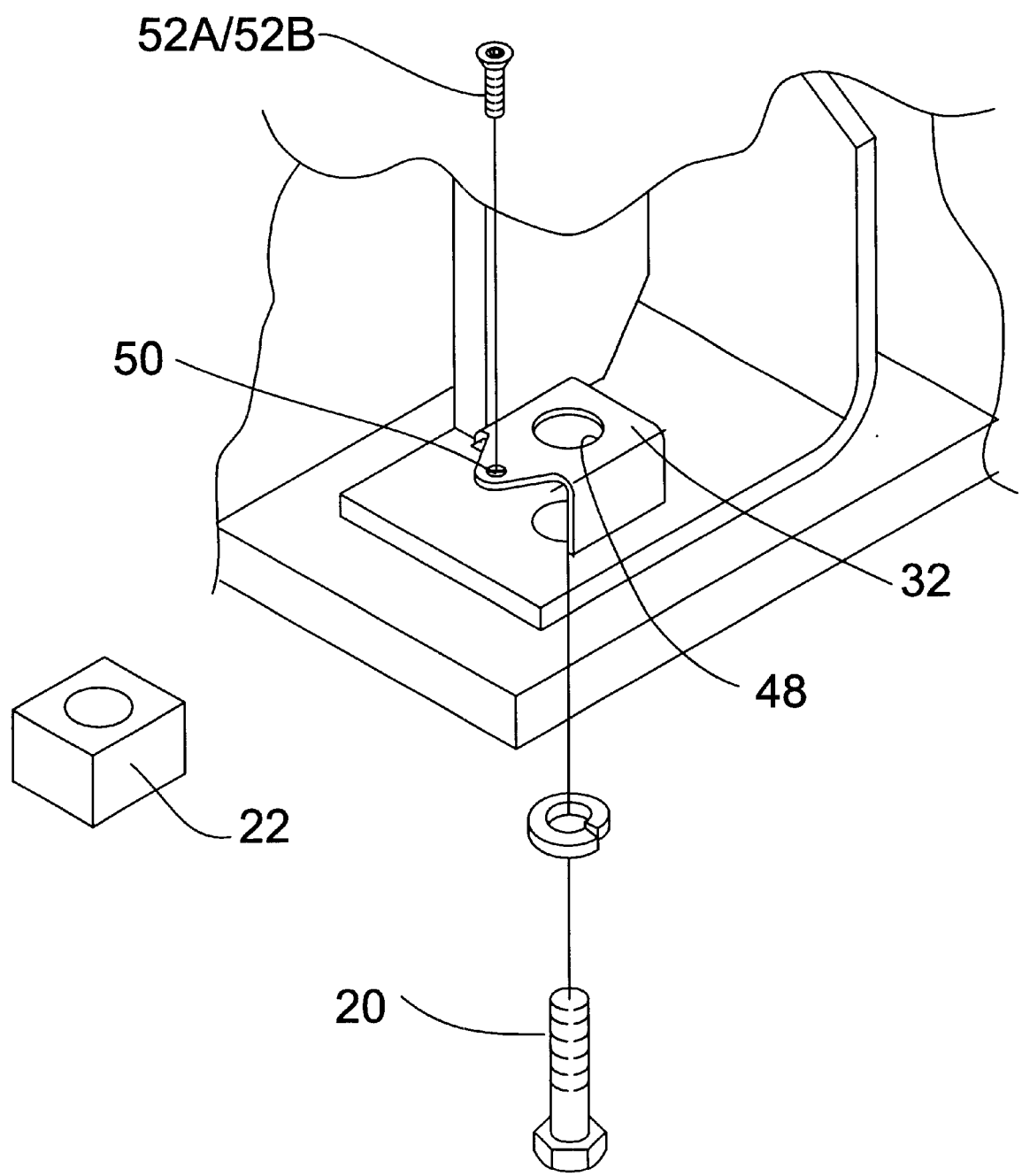
FIG. 3 is an exploded perspective view of the retainer cage of FIG. 2 configured to use a square nut and a male fastener such as a threaded bolt.
Figure 5A:
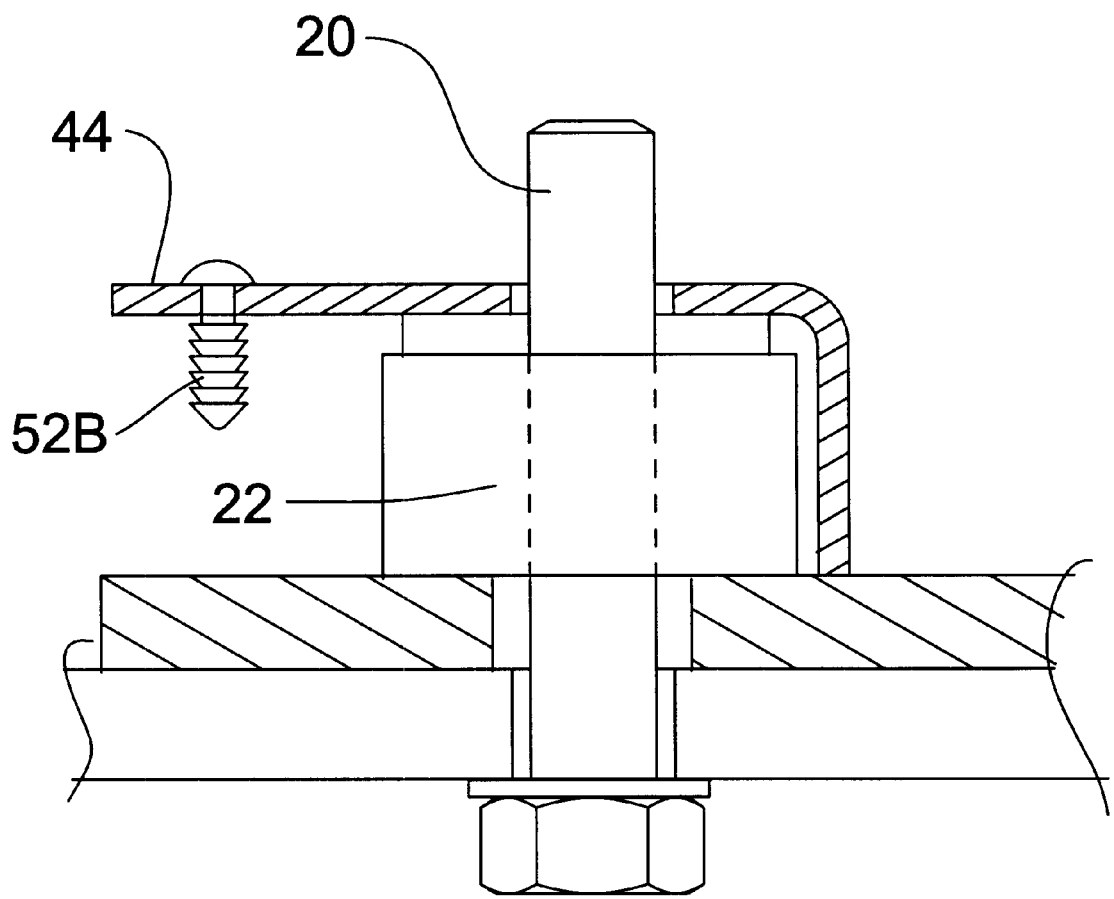
FIG. 5A is another sectional view of the retainer cage illustrated in FIG. 2, along the line 5—5.

In some situations it will be necessary or desirable to install the nut 22 in the retainer cage 30 and confine the nut within the retaining portion by a securing mechanism. Thus, a further embodiment of the retainer cage 30 includes a tongue 44 extending from the web portion 32 at the opening 42. The tongue 44 is positioned over the open side of the retainer cage that is not enclosed by one of the legs 36, 38 or 40 for example, as seen in FIGS. 3 and 5. Preferably the tongue 44 is integrally formed and co-planar with the web portion 32.

Figure 6:
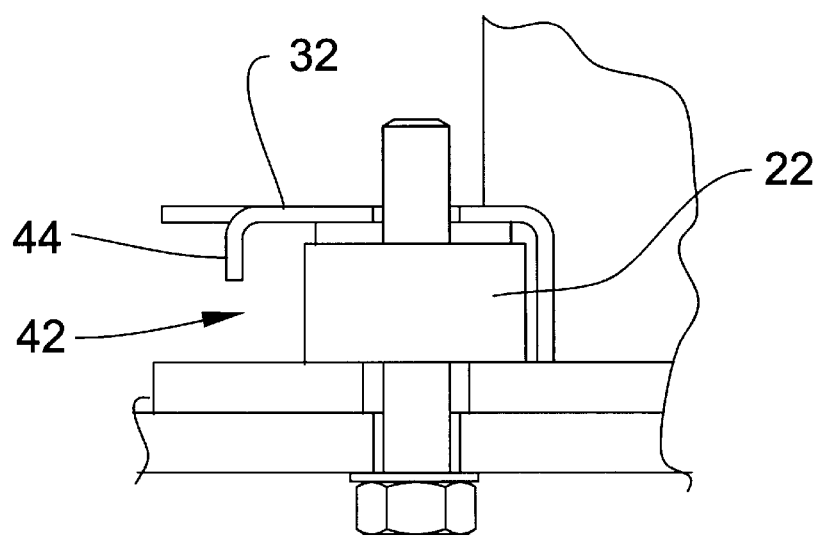
FIG. 6 is sectional view similar to FIG. 5 showing an alternative embodiment of the retainer cage.

In the embodiment of the open retainer cage 30 shown in FIG. 6, the tongue 44 can be deformed or bent at an angle to the web portion 32. The tongue is preferably bent towards the surface 16. The tongue is deformed after the nut 22 is installed within the retainer cage 30. When the tongue 44 is bent to block the opening 42, an additional securing device will not be necessary and the female fastener 22 will be confined in the retainer cage 30.

In another embodiment, shown in FIGS. 3 and 5, the securing mechanism includes the previously described coplanar extending tongue 44. The securing mechanism also includes a hole 50 in the tongue and a selectively insertable and removable blocking member 52. As seen in FIGS. 3 and 5, the hole 50 is configured to receive a removable blocking member such as a threaded screw 52A or a one-way pushpin 52B. The threaded screw 52B can be made of a material such as plastic or metal so that the screw can be readily installed and removed from the hole 50 for the purpose of blocking and unblocking the opening 42. Preferably the one-way pushpin 52B is made of a resilient material such as plastic. The pushpin is constructed with serrated radial flanges. The serrated flanges readily deflect when the pin is pushed into the hole 50 for general one way movement. The plastic pin can be easily cut or broken and removed to unblock the opening 42.

In some instances, the nut 22 can be retained within the retainer cage 30 by gravity, in which case a securing mechanism may not be needed. Such an instance would occur when the retainer cage is vertically orientated and has the opening 42 facing vertical upward with respect to the three legs 36, 38 and 40.

FIG. 7 shows a top schematic view of the preferred three-leg embodiment of the open retainer cage. FIGS. 8A and 8B show two alternative embodiments of two-leg embodiments which can position a nut 22 between two parallel legs (FIG. 8A) or adjacent two perpendicular legs (FIG. 8B) so as to resist rotation of the nut. Securing mechanisms can be used in holes 50A to more fully enclose the retained nut as needed. The securing mechanisms can be similar to the threaded screw 52A or the resilient pin 52B discussed above. Also the extending tongues 44A can be bent to close the openings.

To use the retainer cage according to the present invention, the open retainer cage 30 is affixed to the surface of a component part 16 prior to assembly. The configuration of the open retainer cage 30 permits the installation of the nut 22 after the open retainer cage 30 has been attached to the surface 16 and thus protects the later installed nut 22 from potentially damaging manufacturing operations. The empty retainer cage 30 can be attached to the surface 16 when the surface is appropriately accessible. Then other manufacturing processes can be applied to the component part such as additional welding, blast cleaning, and painting without exposing the threads of the nut 22 to any damaging manufacturing processes. Only when those manufacturing processes are completed is the nut 20 installed in the open retainer cage.

After the nut 22 is installed in the retainer cage, the nut can be confined in the retainer cage, if necessary, by using a securing mechanism. In one embodiment either a threaded screw or a resilient pin 52 is removably inserted into an extending tongue. In another embodiment the tongue 44 is merely bent as previously described. The option to close the open cage is particularly useful if the nut 22 can not be seen or is not accessible by an assembler during the assembly process. The bolt 20 is then inserted through the aligned holes in the abutting surfaces to threadingly engage with the retained nut 22. The retainer cage 30 facilitates the alignment of the male and female fasteners. The limited clearance within the cage allows the assembler to tighten or loosen the fastener even though the assembler cannot see or directly manipulate the fastener device.

The open retainer cage 30 of the present invention facilitates the initial assembly of surface mounted components to a work vehicle. The threaded nut 22 can be added to the open retainer cage 30 only after all potentially damaging manufacturing and assembly procedures have been finished. Thus, additional non-value added re-worked tasks such as masking the nut or re-tapping of contaminated threads on the nut 20 or the bolt 22 are reduced or eliminated.

The retainer cage 30 of the present invention also facilitates easy replacement of parts on the assembly line and easy repairs and maintenance in the field. For example, the nut 22 can be removed from the retainer cage 30 by either unbending the tongue 44 or removing the pin or screw 52 from the tongue. Thus the nut 22 and bolt 20 can be replaced without removing the retainer cage 30 from the surface of the surface mounted component part 16.

Thus, the retainer cage of the present invention facilitates blind-hole fastening and surface mounting of components to various types of surfaces on work vehicles. Other substitutions, modifications, changes and omissions may be made to the design and arrangement of the preferred embodiment without departing from the spirit of the invention as expressed in the appended claims.

What is claimed is:

1. A retainer cage for retaining a threaded female fastener having a non-circular cross section adjacent to a surface of a component part, the retainer cage comprising:

a web portion;

a plurality of legs extending from the web portion toward the surface of the component part, the plurality of legs configured to position the web portion parallel to the surface of the component part;

means for affixing at least one of the plurality of legs to the surface of the component part;

an opening between the plurality of legs for receiving the female fastener within the plurality of legs, the web portion and the surface of the component part; and at least one leg configured to abut the non-circular cross section of the female fastener for resisting rotation of the female fastener;

wherein the plurality of legs extends perpendicularly from the web portion and comprise a first leg, a second leg and a third leg, and wherein the first and second legs are spaced opposite and parallel to each other and the third leg is perpendicular to both the first and second legs and is positioned offset from a position between the first and second legs;

wherein the opening is opposite the third leg and the web portion further comprises blocking means for selectively blocking the opening;

wherein the blocking means further comprises a tongue extending from the web portion, the tongue having a hole adapted to receive a removable blocking member which extends through the hole to block the opening.

2. The retainer cage of claim 1 wherein the removable blocking member is a threaded screw.

3. The retainer cage of claim 1 wherein the removable blocking member is a one way pushpin composed of a resilient material.

4. The retainer cage of claim 1 wherein the web portion and the plurality of legs are integrally formed from a sheet of material, and wherein the legs are deformed perpendicular to the web portion.

5. The retainer cage of claim 1 wherein the sheet of material is metal and the means for affixing is a weldment.

6. The retainer cage of claim 1 wherein the at least one leg is two legs positioned parallel and spaced opposite to each other.

7. The retainer cage of claim 1 wherein the at least one leg is two legs positioned adjacent and perpendicular to each other.

8. The retainer cage of claim 1 wherein the plurality of legs is two legs and further comprising securing means associated with the web portion for securing the female fastener within the two legs.

9. A retainer cage assembly for securing a component part to another component part at a blind-hole, the assembly comprising:

a female fastener having internal threads and a non-circular cross-section;

a male fastener having a threaded shank for insertion through the work piece and through the component part and into threaded engagement with the internal threads of the female fastener;

a retainer cage comprising a web portion offset and parallel to the work piece and a plurality of legs extending from the web portion toward the work piece and configured to hold the female fastener adjacent to the work piece and to resist rotation of the female fastener relative to the male fastener;

an opening in the plurality of legs for receiving the female fastener; and means on at least one of the plurality of legs for affixing the retainer cage to the work piece;

wherein the plurality of legs comprises a first, second and third leg, and wherein the first and second legs are spaced opposite and parallel to each other and the third leg is positioned between and perpendicular to both the first and second legs and wherein the opening is opposite the third leg;

wherein the web portion further comprises blocking means adjacent the opening for selectively blocking the opening;

wherein the blocking means further comprises a tongue extending from the web portion, the tongue having a hole adapted to receive a removable blocking member to block the opening.

10. The retainer cage assembly of claim 9 wherein the removable blocking member is a threaded screw.

11. The retainer cage assembly of claim 9 wherein the removable blocking member is a one way pushpin composed of a resilient material.

12. The retainer cage assembly of claim 9 wherein the web portion and the plurality of legs are integrally formed from a metal sheet and wherein the affixing means is a weldment.

13. A method for securing a component part to another component part using a threaded male fastener and a threaded female fastener having a non-circular cross section, the method comprising the steps of:

providing a retainer cage for retaining the female fastener, the retainer cage comprising a web portion, a plurality of legs extending from the web portion toward the work piece and adapted to position the web portion parallel to the work piece for holding the female fastener adjacent to the work piece, at least one leg configured to abut the non-circular cross section of the female fastener for resisting rotation of the female fastener, and an opening in the plurality of legs for initially receiving the female fastener within the plurality of legs;

affixing at least one of the plurality of legs of the retainer cage to the work piece;

inserting the female fastener into the retaining cage through the opening;

inserting the male fastener through the component part, through the work piece into threading engagement with the female fastener in the retainer cage; and threadingly rotating the male fastener into the female fastener so as to secure the work piece to the component part; and further providing a blocking means on the web portion adjacent the opening and selectively blocking the opening so as to secure the female fastener in the retainer cage.

14. The method of claim 13 wherein the blocking means is a tongue extending from the web portion and the method comprises the further step of deforming the tongue toward the work piece so as to block the opening.

15. The method of claim 13 wherein the blocking means is a tongue extending from the web portion, the tongue having a hole and a removable blocking member adapted for insertion in the hole, the method comprises the further step of inserting the removable blocking member in the hole so as to block the opening.

* * * * *